United States Patent [19]  [11] 4,172,920
Kanda et al.  [45] Oct. 30, 1979

[54] PIGMENT COATED PHOSPHOR

[75] Inventors: Katuzo Kanda, Oisomachi; Noboru Kotera, Hatano; Shusaku Eguchi, Odawara; Hidenaga Horiuchi, Hiratsuka; Kazuhito Iwasaki, Odawara, all of Japan

[73] Assignee: Dai Nippon Toryo Co., Ltd., Osaka, Japan

[21] Appl. No.: 900,855

[22] Filed: Apr. 28, 1978

[30] Foreign Application Priority Data

May 4, 1977 [JP] Japan .................................. 52-51389

[51] Int. Cl.$^2$ ...................... B32B 9/04; C09K 11/02; C09K 11/10; C09K 11/14
[52] U.S. Cl. .................... 428/403; 106/288 B; 106/296; 106/300; 252/301.6 R; 252/301.6 S; 252/301.6 P; 252/301.6 F; 428/404; 428/469; 428/472

[58] Field of Search ................... 106/288 B, 296, 300, 106/308 B; 252/301.6 S, 301.6 R, 301.6 P, 301.6 F; 427/68, 218; 428/403, 404, 469, 472

[56] References Cited

U.S. PATENT DOCUMENTS

| 2,068,294 | 1/1937 | Korinth et al. | 106/296 |
| 3,275,466 | 9/1966 | Kell | 427/68 |
| 3,308,326 | 3/1967 | Kaplan | 427/68 X |
| 3,450,550 | 6/1969 | Linton | 106/308 B |
| 3,886,394 | 5/1975 | Lipp | 427/68 X |
| 4,019,905 | 4/1977 | Tomita et al. | 427/68 X |
| 4,020,231 | 4/1977 | Hedler et al. | 428/403 |
| 4,021,588 | 5/1977 | Royce et al. | 428/403 X |

Primary Examiner—George F. Lesmes
Assistant Examiner—R. Eugene Varndell, Jr.
Attorney, Agent, or Firm—Harold L. Stults

[57] ABSTRACT

A pigment coated phosphor used as a green emitting phosphor for a high contrast color television cathode ray tube. A green emitting phosphor is coated with $TiO_2$—$ZnO$—$CoO$—$NiO$ system pigment particles.

7 Claims, 2 Drawing Figures

PIGMENT COATED PHOSPHOR

BACKGROUND OF THE INVENTION

1. Field of the Invention

This invention relates to a phosphor coated with pigment particles (hereinafter referred to as "pigment coated phosphor"), and more particularly to a pigment coated phosphor employed in a high contrast color television cathode ray tube.

2. Description of the Prior Art

As is well known in the art, pigment particles adhering to the surfaces of phosphor particles such as blue emitting phosphor particles, green emitting phosphor particles and red emitting phosphor particles employed in a color television cathode ray tube markedly enhance the contrast of the image formed on the cathode ray tube. This is because a part of the visible region of the emission spectra inherent in the phosphor is cut due to the filter effect of the pigment particles adhering thereto, which results in a clearer emission color, and further because the pigment particles can absorb a part of the external light to reduce the reflection of light thereby. This is disclosed, for instance in U.S. Pat. No. 3,886,394.

It is required for the pigment coated phosphor employed in a high contrast color television cathode ray tube mentioned above that the reflectance be low and the luminance be sufficiently high. That is, in order to lower the reflectance of the external light by the pigment coated phosphor, it is necessary to increase the amount of the pigment particles adhering to the surface of the phosphor and obtain a higher surface coating rate. In such a pigment coated phosphor having a high surface coating rate, the luminance thereof is inevitably lowered. It is required that the lowering of the luminance be controlled to be as small as possible. In other words, for a given specific reflectance, the luminance is desired to be as high as possible.

Heretofore, chromium oxide ($Cr_2O_3$) have been recommended as green pigment particles for a green pigment coated green emitting phosphor employed in a high contrast color television cathode ray tube. The pigment coated phosphor using the chromium oxide pigment particles satisfies the aforesaid requirement to some extent, but not sufficiently. Therefore, it has not been put into practical use. That is, at present, blue and red pigment coated phosphors are used respectively as the blue and red emitting phosphors of a high contrast color television cathode ray tube, but a green pigment coated phosphor is not used as the green emitting phosphor thereof.

Under the aforesaid circumstances, there is demanded a green pigment coated green emitting phosphor available for practical use whose luminance is higher, when comparing phosphors of the same specific reflectance, than that of the conventional chromium oxide pigment coated green emitting phosphor.

SUMMARY OF THE INVENTION

The object of the present invention is to provide a green pigment coated green emitting phosphor whose luminance is higher, when comparing phosphors of the same specific reflectance, than that of the conventional chromium oxide pigment coated green emitting phosphor.

As the result of various investigations of the green pigment particles adhering to the surface of a green emitting phosphor, the inventors have discovered that the aforesaid object can be achieved when $TiO_2$—ZnO—CoO—NiO system pigment particles are used as green pigment particles.

The pigment coated phosphor in accordance with the present invention is characterized in that the $TiO_2$—ZnO—CoO—NiO system pigment particles adhere to the surface of a green emitting phosphor.

BRIEF DESCRIPTION OF THE INVENTION

FIG. 1 represents the reflection spectra of the $TiO_2$—ZnO—CoO—NiO system pigment particles employed in the pigment coated phosphor of the present invention (curve-a) and the chromium oxide pigment particles employed in the conventional pigment coated phosphor (curve-b), and FIG. 2 represents the relationship between the specific reflectance and the luminance of the pigment coated phosphor of the present invention wherein $TiO_2$—ZnO—CoO—NiO system pigment particles adhere to the surface of the ZnS:Cu,Al phosphor (curve-a) and that of the conventional pigment coated phosphor wherein chromium oxide pigment particles adhere to the surface of the same ZnS:Cu,Al phosphor (curve-b).

DESCRIPTION OF THE PREFERRED EMBODIMENTS

As $TiO_2$—ZnO—CoO—NiO system pigment particles used in the pigment coated phosphor of the present invention, there are employed commercially available products. The $TiO_2$—ZnO—CoO—NiO system pigment contains titanium dioxide ($TiO_2$), zinc oxide (ZnO), cobalt oxide (CoO) and nickel oxide (NiO) as main ingredients. The body color of the $TiO_2$—ZnO—CoO—NiO system pigment varies depending upon the method of production, particle size, contents of the aforesaid main ingredients, and the like. The reflectances at 400 nm, 450 nm, 500 nm, 550 nm, 600 nm, 650 nm and 700 nm of the $TiO_2$—ZnO—CoO—NiO system pigment particles employed in the pigment coated phosphor of the present invention are within the ranges indicated in Table I below wherein the reflectance is shown by a relative value with reference to that of a magnesium oxide diffusion plate defined to be 100%.

Table I

| Wavelength (nm) | 400 | 450 | 500 | 550 | 600 | 650 | 700 |
|---|---|---|---|---|---|---|---|
| Reflectance (%) | not more than 15 | not more than 20 | 15–40 | 20–45 | not more than 25 | not more than 20 | not more than 20 |

Figure 1:
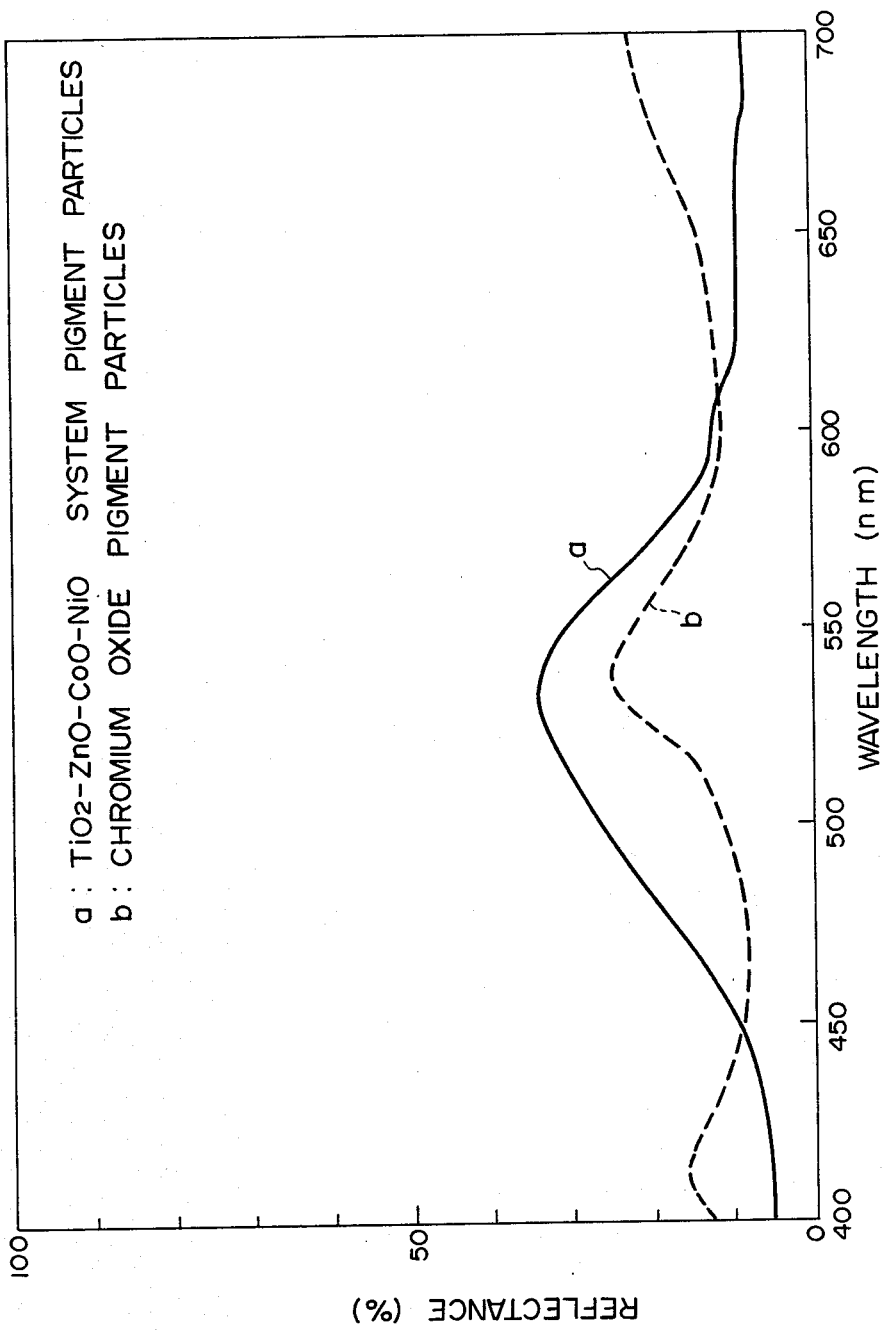

FIG. 1 represents the reflection spectrum of the $TiO_2$—ZnO—CoO—NiO system pigment particles employed in the pigment coated phosphor of the present invention (curve-a) in comparison with that of the chromium oxide pigment particles employed in the conventional pigment coated phosphor (curve-b) wherein the reflectance represented by the ordinate is also shown by a relative value with reference to that of a magnesium oxide diffusion plate defined to be 100%.

The $TiO_2$—ZnO—CoO—NiO system pigment particles employed in the pigment coated phosphor of the present invention should preferably have a mean particle size of less than 3.0μ. When the $TiO_2$—Z- nO—CoO—NiO system pigment particles having a mean particle size larger than 3.0μ are employed, the pigment particles do not firmly adhere to the surface of the phosphor since the pigment particles are too large. Therefore, when using large particles a larger amount of the pigment particles is needed to effect a desired coloration of the phosphor, which marked lowers the luminance of the pigment coated phosphor obtained. More preferably, the mean particle size is within a range of 0.1μ to 1.5μ.

On the other hand, the green emitting phosphors employed in the pigment coated phosphor of the present invention are, for example, a copper activated zinc sulfide phosphor (ZnS:Cu), a copper and aluminium activated zinc sulfide phosphor (ZnS:Cu,Al), a copper activated zinc cadmium sulfide phosphor [(Zn,Cd)S:Cu], a copper and aluminum activated zinc cadmium sulfide phosphor [(Zn,Cd)S:Cu,Al], a silver activated zinc cadmium sulfide phosphor [(Zn,Cd)S:Ag], a silver and aluminium activated zinc cadmium sulfide phosphor [(Zn,Cd)S:Ag,Al], a gold and aluminium activated zinc sulfide phosphor (ZnS:Au,Al), a copper, gold and aluminium activated zinc sulfide phosphor (ZnS:Cu,Au,Al), a silver activated zinc sulfoselenide phosphor [Zn(S,Se):Ag], a silver and aluminium activated zinc sulfoselenide phosphor [Zn(S,Se):Ag,Al], a copper activated zinc sulfoselenide phosphor [Zn(S,Se):Cu], a copper and aluminum activated zinc sulfoselenide phosphor [Zn(S,Se):Cu,Al], a self-activated zinc oxide phosphor (ZnO:Zn), and a manganese activated zinc silicate phosphor ($Zn_2SiO_4$:Mn). The sulfide phosphors included in the above mentioned green emitting phosphors may contain a very small amount of halogen, bismuth, antimony, and the like. Among the green emitting phosphors mentioned above, the ZnS:Cu,Al phosphor and (Zn,Cd)S:Cu,Al phosphor which are practically used as the green emitting phosphors for a color television cathode ray tube are especially recommended. These green emitting phosphors employed in the pigment coated phosphor of the present invention should preferably have a mean particle size within a range of 3μ to 15μ, more preferably of 4μ to 12μ.

As the process for preparing the pigment coated phosphor of the present invention by coating the surface of a green emitting phosphor with $TiO_2$—ZnO—CoO—NiO system pigment particles, the conventional process for preparing a pigment coated phosphor as disclosed in the aforesaid U.S. Pat. No. 3,886,394 may be adopted. In U.S. Pat. No. 3,886,394, pigment particles dispersed in an appropriate solution of a water soluble resin such as polyvinyl pyrrolidone are mixed with a phosphor dispersed in an aqueous solution of gelatin, and then the mixture is stirred and the resulting precipitate is dried to obtain a pigment coated phosphor. However, in the preparation of a pigment coated phosphor, it is important that the pigment particles adhere uniformly and firmly to the surface of the phosphor. As the process for having the pigment particles adhere to the surface of the phosphor uniformly and firmly are recommended, for instance, a process utilizing a suspension polymerization method, a process utilizing a copolymerization method and a process using a gelatin-gum arabic mixture as a binder.

In the pigment coated phosphor of the present invention, in general, the amount of the $TiO_2$—ZnO—CoO—NiO system pigment particles adhering to the surface of the green emitting phosphor is preferably within a range of 0.02 to 10 parts by weight per 100 parts by weight of the green emitting phosphor, though it depends upon various factors such as the kind of the green emitting phosphor employed, the particle size thereof, the kind of the $TiO_2$—ZnO—CoO—NiO system pigment particles employed and the particle size thereof. When the amount of the pigment particles is not more then 0.02 parts, it is impossible to obtain a sufficiently high contrast, while when it is not less than 10 parts, the luminance is lowered.

Figure 2:
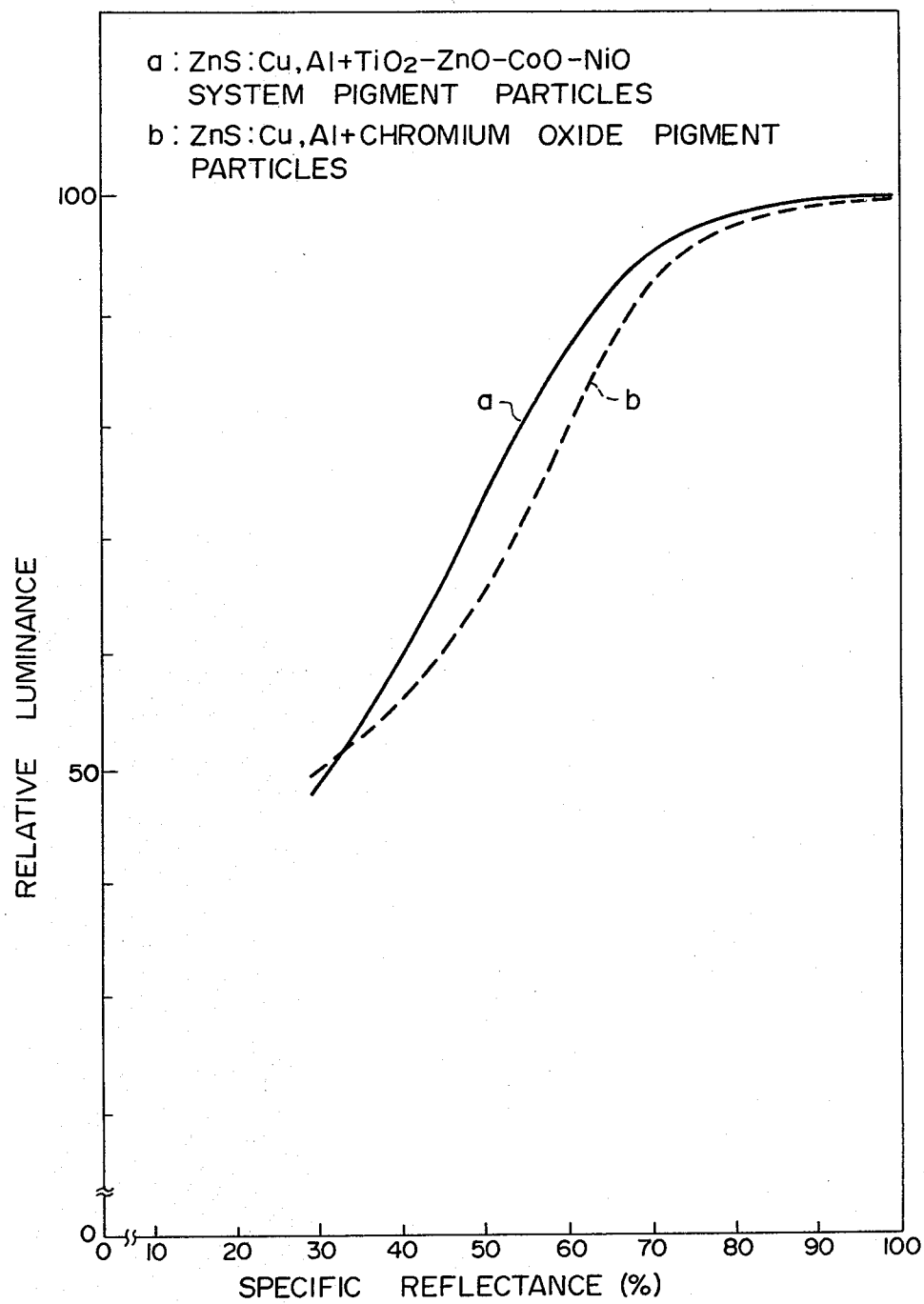

FIG. 2 represents the relationship between the specific reflectance and the luminance of the pigment coated phosphor of the present invention wherein $TiO_2$—ZnO—CoO—NiO system pigment particles adhere to the surface of the ZnS:Cu,Al phosphor (curve-a) in comparison with that of the conventional pigment coated phosphor wherein chromium oxide pigment particles adhere to the surface of the same ZnS:Cu,Al phosphor (curve-b). In FIG. 2, the luminance represented by the ordinate is shown by a relative value with reference to that of the uncoated ZnS:Cu,Al phosphor defined to be 100%.

As is clear from FIG. 2, within a range of practical specific reflectance, the luminance of the pigment coated phosphor of the present invention is always higher, when comparing phosphors of the same specific reflectance, than that of the conventional pigment coated phosphor. Though the relationship between the specific reflectance and the luminance of the pigment coated phosphor of the present invention using a green emitting phosphor varies depending upon the kind of the $TiO_2$—ZnO—CoO—NiO system pigment particles employed and the particle size thereof, the result of the experiments indicates that, within the range of the practical specific reflectance, the pigment coated phosphor of the present invention exhibits higher luminance, when comparing phosphors of the same specific reflectance, than that of the conventional pigment coated phosphor using chromium oxide pigment particles.

As is described above, in accordance with the present invention, there is provided a pigment coated phosphor whose luminance is higher, when comparing phosphors of the same specific reflectance, than that of the conventional pigment coated phosphor.

The pigment coated phosphor of the present invention is used mainly as a green emitting phosphor for a high contrast color television cathode ray tube. However, it should be noted that the use thereof is not limited only to the green emitting phosphor for a high contrast color television cathode ray tube.

The present invention will hereinbelow be described with reference to several examples thereof. It should, however, be understood that the invention is not limited to these examples.

EXAMPLE 1

0.6 parts by weight of gelatin were dissolved in water of 40° C. to prepare a 0.3% aqueous solution of gelatin. To the resulting 0.3% aqueous solution of gelatin were added 100 parts by weight of copper and aluminium activated zinc sulfide green emitting phosphor (ZnS:Cu,Al) having a mean particle size of 10μ, and the resulting mixture was then well stirred with a stirrer to disperse the phosphor particles as primary particles. A phosphor dispersion was thus obtained.

On the other hand, 0.4 parts by weight of gum arabic were dissolved in water to prepare a 0.3% aqueous solution thereof. 0.2 parts by weight of $TiO_2$—Z- nO—CoO—NiO system pigment particles having a mean particle size of about $0.5\mu$ (No. 9320, made by Dainichiseika Co., Ltd.) were then added to the 0.3% aqueous solution of gum arabic and well stirred with a stirrer till the pigment particles became primary particles. A pigment dispersion was thus obtained.

Then, the phosphor dispersion and the pigment dispersion were mixed by stirring. The pH of the resulting mixture was adjusted to 4.0 and the temperature thereof was lowered to below 10° C. To the mixture was then added gradually 1 part by weight of formaline while the mixture was continuously stirred. After the mixture was allowed to stand, a precipitate was obtained. The supernatant solution was removed and the precipitate was washed with water. The precipitate was then separated from water and concentrated using a decanter to yield a pigment coated phosphor cake containing about 85% of solid content. The cake was dried in a stream of air to obtain a pigment coated phosphor of the present invention.

The conventional pigment coated phosphor using chromium oxide pigment particles was prepared in the same manner as that mentioned above except 0.15 parts by weight of chromium oxide pigment particles having a mean particle size of about $0.5\mu$ (X-1134, made by Hercules Co., Ltd.) were used instead of the aforesaid 0.2 parts by weight of $TiO_2$—ZnO—CoO—NiO system pigment particles.

As is shown in Table II below, the specific reflectance of the pigment coated phosphor of the present invention obtained was almost the same as that of the conventional pigment coated phosphor. However, the luminance thereof was higher than that of the conventional one.

EXAMPLE 2

0.6 parts by weight of gelatin were dissolved in water of 40° C. to prepare a 0.3% aqueous solution of gelatin. To the resulting 0.3% aqueous solution of gelatin were added 100 parts by weight of copper and aluminium activated zinc sulfide green emitting phosphor (ZnS:Cu,Al) having a mean particle size of $10\mu$, and the resulting mixture was then well stirred with a stirrer to disperse the phosphor particles as primary particles. A phosphor dispersion was thus obtained.

On the other hand, 0.4 parts by weight of gum arabic were dissolved in water to prepare a 0.3% aqueous solution thereof. 0.3 parts by weight of $TiO_2$—ZnO—CoO—NiO system pigment particles having a mean particle size of about $0.5\mu$ (No. 9310, made by Dainichiseika Co., Ltd.) were then added to the 0.3% aqueous solution of gum arabic and well stirred with a stirrer till the pigment particles became primary particles. A pigment dispersion was thus obtained.

Then, the phosphor dispersion and the pigment dispersion were mixed by stirring. The pH of the resulting mixture was adjusted to 4.0 and the temperature thereof was lowered to below 10° C. To the mixture was then added gradually 1 part by weight of formaline while the mixture was continuously stirred. After the mixture was allowed to stand, a precipitate was obtained. The supernatant solution was removed and the precipitate was washed with water. The precipitate was then separated from water and concentrated using a decanter to yield a pigment coated phosphor cake containing about 85% of solid content. The cake was dried in a stream of air to obtain a pigment coated phosphor of the present invention.

The conventional pigment coated phosphor using chromium oxide pigment particles was prepared in the same manner as that mentioned above except 0.25 parts by weight of chromium oxide pigment particles having a mean particle size of about $0.5\mu$ (X-1134, made by Hercules Co., Ltd.) were used instead of the aforesaid 0.3 parts by weight of $TiO_2$—ZnO—CoO—NiO system pigment particles.

As is shown in Table II below, the specific reflectance of the pigment coated phosphor of the present invention obtained was almost the same as that of the conventional pigment coated phosphor. However, the luminance thereof was higher than that of the conventional one.

EXAMPLE 3

0.6 parts by weight of gelatin were dissolved in water of 40° C. to prepare a 0.3% aqueous solution of gelatin. To the resulting 0.3% aqueous solution of gelatin were added 100 parts by weight of copper and aluminium activated zinc sulfide green emitting phosphor (ZnS:Cu,Al) having a mean particle size of $10\mu$, and the resulting mixture was then well stirred with a stirrer to disperse the phosphor particles as primary particles. A phosphor dispersion was thus obtained.

On the other hand, 0.4 parts by weight of gum arabic were dissolved in water to prepare a 0.3% aqueous solution thereof. 0.5 parts by weight of $TiO_2$—ZnO—CoO—NiO system pigment particles having a mean particle size of about $0.5\mu$ (No. 9320, made by Dainichiseika Co., Ltd.) were then added to the 0.3% aqueous solution of gum arabic and well stirred with a stirrer till the pigment particles became primary particles. A pigment dispersion was thus obtained.

Then, the phosphor dispersion and the pigment dispersion were mixed by stirring. The pH of the resulting mixture was adjusted to 4.0 and the temperature thereof was lowered to below 10° C. To the mixture was then added gradually 1 part by weight of formaline while the mixture was continuously stirred. After the mixture was allowed to stand, a precipitate was obtained. The supernatant solution was removed and the precipitate was washed with water. The precipitate was then separated from water and concentrated using a decanter to yield a pigment coated phosphor cake containing about 85% of solid content. The cake was dried in a stream of air to obtain a pigment coated phosphor of the present invention.

The conventional pigment coated phosphor using chromium oxide pigment particles was prepared in the same manner as that mentioned above except 0.35 parts by weight of chromium oxide pigment particles having a mean particle size of about $0.5\mu$ (X-1134, made by Hercules Co., Ltd.) were used instead of the aforesaid 0.5 parts by weight of $TiO_2$—ZnO—CoO—NiO system pigment particles.

As is shown in Table II below, the specific reflectance of the pigment coated phosphor of the present invention obtained was almost the same as that of the conventional pigment coated phosphor. However, the luminance thereof was higher than that of the conventional one.

EXAMPLE 4

10 parts by weight of polyvinylbutyral resin were dissolved in 85 parts by weight of ethanol. To the resulting solution were added 100 parts by weight of copper and aluminium activated zinc sulfide green emitting phosphor (ZnS:Cu,Al) having a mean particle size of 10μ and 0.8 parts by weight of TiO₂—ZnO—CoO—NiO system pigment particles having a mean particle size of about 0.5μ (No. 9320, made by Dainichiseika Co., Ltd.). Then the mixture was ball-milled to disperse the phosphor and the pigment particles uniformly in the solution. A phosphor-pigment dispersion was thus obtained.

Then, the phosphor-pigment dispersion was continuously mixed with water in a mixing weight ratio of 1 part of the dispersion: 10 parts of water using a line-mixer. By the mixing, the solvent (ethanol) was separated from the phosphor and the pigment particles which were bound together by the polyvinylbutyral and there was obtained a precipitate. The precipitate was then taken out and concentrated using a decanter to yield a pigment coated phosphor cake containing about 85% of solid content. The cake was dried in a stream of air to obtain a pigment coated phosphor of the present invention.

The conventional pigment coated phosphor was prepared in the same manner as that mentioned above except 0.65 parts by weight of chromium oxide pigment particles having a mean particle size of about 0.5μ (X-1134, made by Hercules Co., Ltd.) were used instead of the aforesaid 0.8 parts by weight of TiO₂—ZnO—CoO—NiO system pigment particles.

As is shown in Table II below, the specific reflectance of the pigment coated phosphor of the present invention obtained was almost the same as that of the conventional pigment coated phosphor. However, the luminance thereof was higher than that of the conventional one.

EXAMPLE 5

A copper and aluminium activated zinc sulfide phosphor (ZnS:Cu,Al) having a mean particle size of 10μ was prepared as a green emitting phosphor.

TiO₂—ZnO—CoO—NiO system pigment particles having a mean particle size of about 0.5 (No. 9310, made by Dainichiseika Co., Ltd.) were dispersed uniformly in a nitrocellulosealkyd resin solution (DNT clear lacquer, made by Dai Nippon Toryo Co., Ltd.) by a ball mill. A pigment particle dispersed adhesive solution was thus obtained. The ingredients of the resulting pigment particle dispersed adhesive solution and the amount of the ingredients were as follows.

| | |
|---|---|
| DNT clear lacquer | 10 parts by weight |
| TiO₂-ZnO-CoO-NiO system pigment particles | 0.8 parts by weight |
| Diluent (triol/ethyl acetate = 1/1) | 25 parts by weight |

Then, the aforesaid green emitting phosphor was put into a tank of an electrostatic coating machine (made by Ransburg Co., Ltd.), and the machine was prepared to charge the green emitting phosphor particles sprayed into positive polarity. On the other hand, the aforesaid pigment particle dispersed adhesive solution was put into a tank of another electrostatic coating machine (White Dragon, made by Nippon Kogei Co., Ltd.), and the machine was prepared to charge the microdrops of the solution sprayed into negative polarity. The voltage of the electrostatic generators of the coating machines was adjusted to 7 kilovolts, and the pressure of the air spouted from the compressors of the coating machines was adjusted to 4 Kg/cm. Spray guns for the green emitting phosphor and the pigment particle dispersed adhesive solution were located so that the distance between the tops of the guns was 20 cm and the angle between the directions in which the phosphor particles and the microdrops of solution were sprayed respectively by the guns was 60°. The green emitting phosphor and the pigment particle dispersed adhesive solution were sprayed into a cyclone maintained at a temperature ranging from 20 to 30° C. at the rate of 100 g/minute and 18 g/minute, respectively. By an electrostatic attractive force, the microdrops of the pigment particle dispersed adhesive solution was caused to adhere to the surface of the green emitting phosphor, and a pigment coated phosphor having a uniform coating of pigment particles dropped down on the bottom of the cyclone. Thus, the pigment coated phosphor of the present invention was obtained.

The conventional pigment coated phosphor using chromium oxide pigment particles was prepared in the same manner as that mentioned above except 0.6 parts by weight of chromium oxide pigment particles having a mean particle size of about 0.5μ (X-1134, made by Hercules Co., Ltd.) were used instead of the aforesaid 0.8 parts by weight of TiO₂—ZnO—CoO—NiO system pigment particles.

As is shown in Table II below, the specific reflectance of the pigment coated phosphor of the present invention was almost the same as that of the conventional pigment coated phosphor. However, the luminance thereof was higher than that of the conventional one.

Table II

| Example No. | Green Pigment Particles | Specific Reflectance (%) | Luminance (%) |
|---|---|---|---|
| 1 | a | 78.7 | 97.8 |
| | b | 78.9 | 96.0 |
| 2 | a | 74.8 | 97.0 |
| | b | 75.0 | 95.0 |
| 3 | a | 69.0 | 94.2 |
| | b | 68.9 | 92.0 |
| 4 | a | 60.0 | 86.4 |
| | b | 60.2 | 78.5 |
| 5 | a | 71.2 | 95.7 |
| | b | 71.0 | 93.0 | a TiO₂-ZnO-CoO-NiO system pigment particles
b chromium oxide pigment particles
* Luminance is shown by a relative value with reference to that of the uncoated green emitting phosphor defined to be 100%.
*The light source usd for measuring the specific reflectance was a tungsten lamp.

We claim:

1. A pigment coated phosphor comprising a green emitting phosphor and TiO₂—ZnO—CoO—NiO system pigment particles adhering to the surface of said green emitting phosphor.

2. A pigment coated phosphor as defined in claim 1 wherein the reflectance of said pigment particles at wavelengths of 400 nm, 450 nm, 500 nm, 550 nm, 600 nm, 650 nm and 700 nm is not more than 15%, not more than 20%, 15 to 40%, 20 to 45%, not more than 25%, not more than 20% and not more than 20%, respectively, when the reflectance of a magnesium oxide diffusion plate is defined to be 100%.

3. A pigment coated phosphor as defined in claim 1 wherein the amount of said pigment particles is within a range of 0.02 to 10 parts by weight per 100 parts by weight of said green emitting phosphor.

4. A pigment coated phosphor as defined in claim 1 wherein said green emitting phosphor is a copper and aluminium activated zinc sulfide phosphor.

5. A pigment coated phosphor as defined in claim 1 wherein said green emitting phosphor is a copper and aluminium activated zinc cadmium sulfide phosphor.

6. A pigment coated phosphor as defined in claim 1 wherein the mean particle size of said green emitting phosphor is within a range of $3\mu$ to $15\mu$, and the mean particle size of said pigment particles is less than $3\mu$.

7. A pigment coated phosphor as defined in claim 3 wherein said mean particle size of said green emitting phosphor is within a range of $4\mu$ to $12\mu$, and said mean particle size of said pigment particles is within a range of $0.1\mu$ to $1.5\mu$.

* * * * *